(12) United States Patent
Nishikawa et al.

(10) Patent No.: US 10,498,199 B2
(45) Date of Patent: Dec. 3, 2019

(54) ROTARY ELECTRIC MACHINE

(71) Applicant: Mitsubishi Electric Corporation, Tokyo (JP)

(72) Inventors: Ken Nishikawa, Tokyo (JP); Norihiro Watanabe, Tokyo (JP); Koichi Ojima, Tokyo (JP)

(73) Assignee: Mitsubishi Electric Corporation, Tokyo (JP)

(\*) Notice: Subject to any disclaimer, the term of this patent is extended or adjusted under 35 U.S.C. 154(b) by 207 days.

(21) Appl. No.: 15/807,677

(22) Filed: Nov. 9, 2017

(65) Prior Publication Data
US 2018/0309348 A1 Oct. 25, 2018

(30) Foreign Application Priority Data

Apr. 21, 2017 (JP) ................................. 2017-084385

(51) Int. Cl.
*H02K 9/00* (2006.01)
*H02K 9/20* (2006.01)
*H02K 11/25* (2016.01)
*H02K 9/19* (2006.01)
*H02K 3/24* (2006.01)

(52) U.S. Cl.
CPC ............... *H02K 11/25* (2016.01); *H02K 3/24* (2013.01); *H02K 9/19* (2013.01)

(58) Field of Classification Search
CPC ............. H02K 11/25; H02K 3/24; H02K 9/19
USPC ...................................................... 310/52, 54
See application file for complete search history.

(56) References Cited

U.S. PATENT DOCUMENTS

| 5,019,733 A * | 5/1991 | Kano ....................... H02K 9/02 |
| | | 310/52 |
| 5,682,074 A * | 10/1997 | Di Pietro ........... B22D 19/0054 |
| | | 310/211 |
| 7,208,854 B1 * | 4/2007 | Saban ..................... H02K 1/32 |
| | | 310/52 |

(Continued)

FOREIGN PATENT DOCUMENTS

| CN | 102246393 A | 11/2011 |
| JP | 2013-211941 A | 10/2013 |

OTHER PUBLICATIONS

First Office Action dated Sep. 20, 2019 issued by the State Intellectual Property Office of People's Republic of China in counterpart application No. 201810074138.4.

*Primary Examiner* — Yuriy Semenenko
(74) *Attorney, Agent, or Firm* — Sughrue Mion, PLLC; Richard C. Turner

(57) ABSTRACT

A rotary electric machine of the present invention includes, inside a housing, a rotor and a stator that are concentric with each other. The stator has a plurality of coil portions in a circumferential direction. In the stator, a first flow channel and a second flow channel, through which cooling water flows, are provided along the plurality of coil portions, each of the channels having one end connected to a flow channel inlet and the other end connected to a flow channel outlet. The lengths of the first flow channel and the second flow channel are mutually different. A temperature detection element is provided in a coil portion on a high temperature side among the coil portions positioned along the first flow channel and the coil portions positioned along the second flow channel.

16 Claims, 2 Drawing Sheets

(56) References Cited

U.S. PATENT DOCUMENTS

| | | | |
|---|---|---|---|
| 8,552,603 B2* | 10/2013 | Minemura | H02K 9/19 |
| | | | 310/52 |
| 9,099,900 B2* | 8/2015 | Glubrecht | H02K 1/20 |
| 2009/0200879 A1* | 8/2009 | Ghodsi-Khameneh | |
| | | | H02K 3/28 |
| | | | 310/71 |
| 2011/0258840 A1 | 10/2011 | Urano et al. | |
| 2012/0133222 A1* | 5/2012 | Han | H02K 5/20 |
| | | | 310/58 |
| 2012/0286596 A1* | 11/2012 | Creviston | H02K 5/20 |
| | | | 310/59 |
| 2013/0126143 A1* | 5/2013 | Sheu | F28F 1/00 |
| | | | 165/177 |
| 2013/0328425 A1* | 12/2013 | Tomita | H02K 11/0094 |
| | | | 310/71 |
| 2016/0013705 A1* | 1/2016 | Takei | H02K 9/19 |
| | | | 310/54 |
| 2016/0204679 A1* | 7/2016 | Yamada | H02K 1/32 |
| | | | 310/45 |
| 2018/0091006 A1* | 3/2018 | Wang | H02K 1/165 |

* cited by examiner

ROTARY ELECTRIC MACHINE

BACKGROUND OF THE INVENTION

1. Field of the Invention

The present invention relates to a rotary electric machine that is provided with a temperature detection element.

2. Description of the Related Art

Rotary electric machines for vehicle driving and engine assisting are often disposed between an engine and a transmission. Such rotary electric machines often adopt thin flat structures conforming to the space in which the machine is to be mounted.

Coil portions wound on stator cores of such rotary electric machine heat up when energized. Accordingly, a temperature detection element is disposed in the coil portions, together with a mechanism for cooling the latter. The heat-resistant life of coils can be secured over a prolonged period of time through suppression of torque, using values detected by the temperature detection element.

A coil portion of a stator is provided in a housing of the rotary electric machine disclosed in Japanese Patent Application Laid-open No. 2013-211941. A cooling water channel is provided outside the coil portion. A temperature detection element is provided on the surface of one of the coil end portions of the coil portion. A gap is present between the housing and the coil end portion on the side on which the temperature detection element is attached. Meanwhile, the space between the housing and the coil end portion, on the side on which the temperature detection element is not attached, is filled with a resin of higher thermal conductivity than the thermal conductivity of air. Therefore, the thermal resistance from the surface of the coil end portion that is in contact with the temperature detection element up to the cooling water channel is greater than the thermal resistance from the surface of the coil end portion that is not in contact with the temperature detection element up to the cooling water channel. In consequence, the temperature of the coil portion is measured by the temperature detection element without any heat escaping from the temperature detection element.

SUMMARY OF THE INVENTION

The rotary electric machine disclosed in Japanese Patent Application Laid-open No. 2013-211941, however, is problematic in that the resin must be filled over the entire circumference of the coil end portion of the stator, which translates into greater manufacturing costs.

The present invention was made to solve the above mentioned problem, and is aimed at obtaining a rotary electric machine that can detect the temperature of a high-temperature coil portion with only a simple structure.

The rotary electric machine of the present invention includes, inside a housing, a rotor and a stator that are concentric with each other, wherein the stator has a plurality of coil portions in a circumferential direction; in the stator, a first flow channel and a second flow channel, through which cooling water flows, are provided along the plurality of coil portions, each of the channels having one end connected to a flow channel inlet and the other end connected to a flow channel outlet; the lengths of the first flow channel and the second flow channel are mutually different; temperature detection element provided in a coil portion on a high temperature side among the coil portions positioned along the first flow channel and the coil portions positioned along the second flow channel.

In the rotary electric machine of the present invention, cooling water that cools the coil portions of the stator flows through the first flow channel and the second flow channel. The lengths of the first flow channel and the second flow channel are mutually different; accordingly, a difference arises in the temperature of coil portions between coil portions positioned along the first flow channel and coil portions positioned along the second flow channel. Detection of the temperature of the coil portions can be made more reliable by providing the temperature detection element in a coil portion on the high temperature side, from among such coil portions.

As a result, a rotary electric machine can be obtained that can detect the temperature of a high-temperature coil portion with only a simple structure.

DESCRIPTION OF THE PREFERRED EMBODIMENTS

Embodiments of the rotary electric machine of the present invention will be explained next with reference to accompanying drawings. Identical or corresponding portions will be denoted by identical reference symbols, and a recurrent explanation thereof will be omitted.

Embodiment 1

Figure 1:
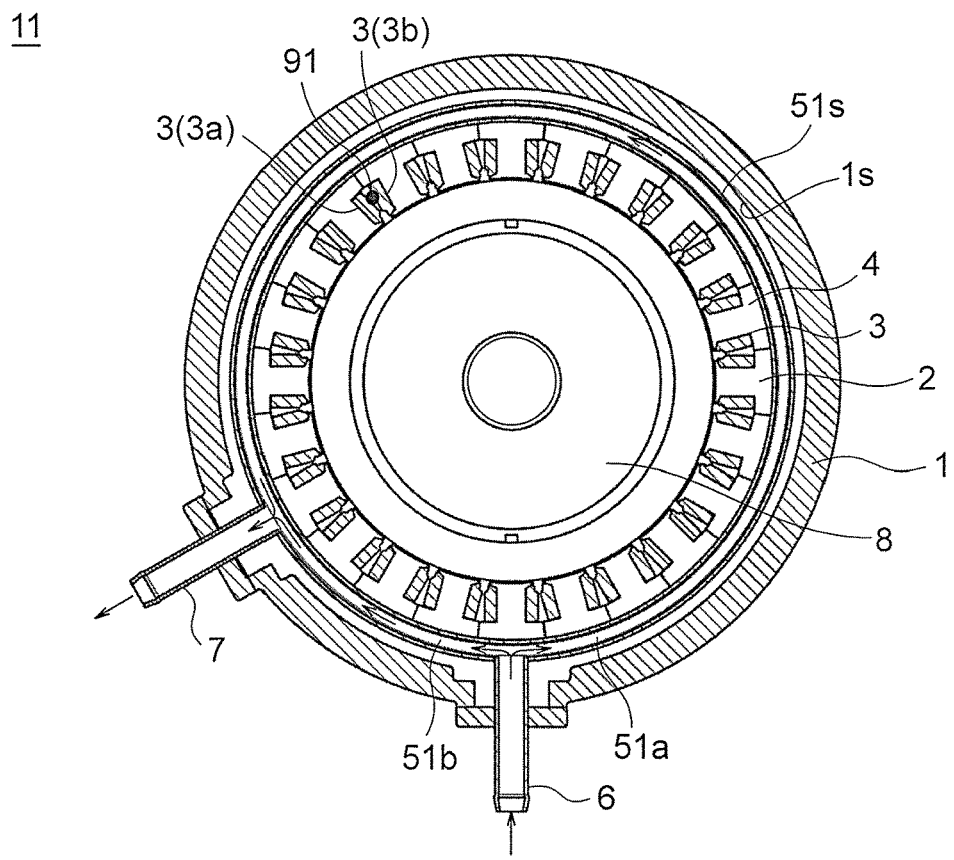
FIG. 1 is a cross-sectional view, in the axial direction, of a rotary electric machine of Embodiment 1 of the present invention.

FIG. 1 is a cross-sectional view, in the axial direction, of a rotary electric machine 11 of Embodiment 1 of the present invention. The rotary electric machine 11 is used for driving a vehicle. A cylindrical rotor 8 is provided in the center of a cylindrical housing 1. A stator 2 is provided outward of the rotor 8, coaxially with the latter. Split cores 4 having coil portions 3 are provided, juxtaposed along the circumferential direction, in the stator 2. A first flow channel 51a and a second flow channel 51b are provided along the outer periphery of the plurality of coil portions 3, between the stator 2 and the housing 1. Both the first flow channel 51a and the second flow channel 51b are hollow and have water flowing therethrough. An inlet nipple 6 as a flow channel inlet is provided at one end of the first flow channel 51a and one end of the second flow channel 51b. An outlet nipple 7 as a flow channel outlet is provided at the other end of the first flow channel 51a and the other end of the second flow channel 51b. An outer wall 51s of the first flow channel 51a and the second flow channel 51b constitutes a continuous surface, spaced from the inner wall is of the housing 1.

As indicated by the arrows in FIG. 1, cooling water flows in through the inlet nipple 6. In the first flow channel 51a, the cooling water advances from the inlet nipple 6, in a counterclockwise direction, to reach the outlet nipple 7. In the second flow channel 51b, the cooling water advances from the inlet nipple 6 in a clockwise direction, to reach the outlet nipple 7. The cooling water flowing through the first flow channel 51a or the second flow channel 51b flows out through the outlet nipple 7. In the first flow channel 51a, a temperature detection element 91 is provided between coil portions 3a and 3b that are positioned closer to the outlet nipple 7 than to the midpoint between the inlet nipple 6 and the outlet nipple 7.

Figure 2:
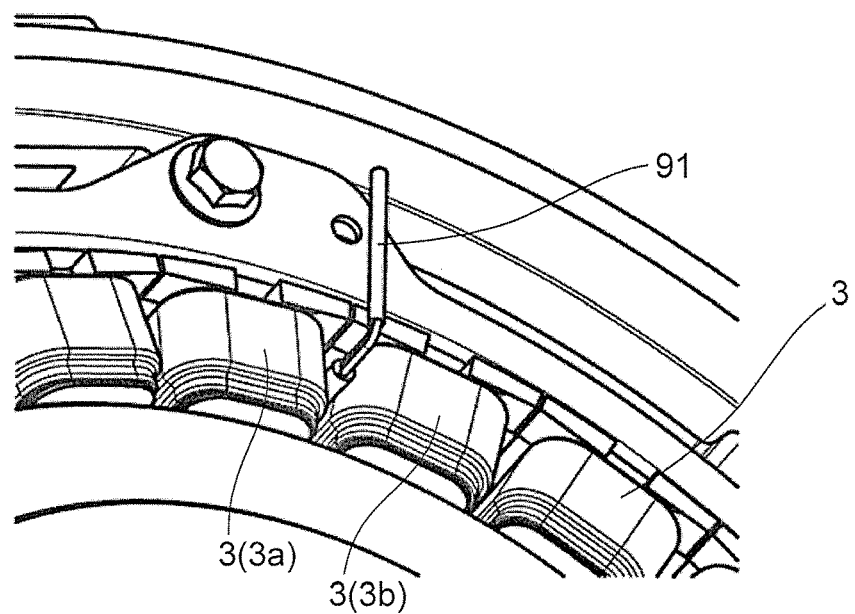
FIG. 2 is a view illustrating an arrangement state of a temperature detection element in Embodiment 1.

FIG. 2 is a view illustrating the arrangement of the temperature detection element 91. As illustrated in FIG. 2, the temperature detection element 91 is inserted between two adjacent coil portions 3a and 3b. The temperature detection element 91 is fixed through contact with both the coil portions 3a and 3b. Therefore, the temperature detection element 91 detects the average temperature of the coil portions 3a and 3b with which the temperature detection element 91 is in contact.

The operation of the rotary electric machine of Embodiment 1 will be explained next with reference to FIG. 1.

The cooling water flowing through the first flow channel 51a and the second flow channel 51b cools the coil portions 3 of the stator 2 through heat transfer. Difference in flow rates arises in a case where the flow channels are divided into two and the lengths of the respective flow channels are different. The cooling efficiency of the coil portions 3 positioned along a flow channel side of a lower flow rate is relatively poor, and hence the temperature is higher than that of coil portions 3 positioned along the flow channel side of a higher flow rate.

In Embodiment 1, the flow rate in the first flow channel 51a is lower than the flow rate in the second flow channel 51b. Accordingly, the temperature of coil portions 3 positioned along the first flow channel 51a is higher than the temperature of coil portions 3 positioned along the second flow channel 51b.

The cooling water advances through the interior of the first flow channel 51a or the second flow channel 51b, from the inlet nipple 6 towards the outlet nipple 7, while cooling the coil portions 3 in doing so. Accordingly, the temperature of the cooling water is higher in the vicinity of the outlet nipple 7 than in the vicinity of the inlet nipple 6. When the temperature of the cooling water is high, cooling efficiency drops and hence the coil portions 3 that are positioned closer to the outlet nipple 7 than that of the midpoint of the respective flow channels are comparatively harder to cool.

In the first flow channel 51a, thus, the coil portions 3a and 3b that are positioned closer to the outlet nipple 7 than the midpoint between the inlet nipple 6 and the outlet nipple 7, are at a higher temperature. The temperature of such high-temperature coil portions 3a and 3b can be detected by providing the temperature detection element 91 in the coil portions 3a and 3b.

Thus, the rotary electric machine 11 of Embodiment 1 has the rotor 8 and the stator 2 that are concentric with each other inside the housing 1. The stator 2 has the plurality of coil portions 3 in the circumferential direction; in the stator 2, the first flow channel 51a and the second flow channel 51b through which cooling water flows, are provided along the plurality of coil portions 3, with each having one end connected to the inlet nipple 6 and the other end connected to the outlet nipple 7; the lengths of the first flow channel 51a and the second flow channel 51b are different; and the temperature detection element 91 is provided in the coil portions 3a and 3b on the high temperature side among the coil portions 3 positioned along the first flow channel 51a and the coil portions 3 positioned along the second flow channel 51b.

As a result, a rotary electric machine can be obtained that can detect the temperature of the high-temperature coil portions 3a and 3b with only a simple structure.

The flow rate in the first flow channel 51a is lower than the flow rate in the second flow channel 51b, and in the first flow channel 51a the temperature detection element 91 is provided in the coil portions 3a and 3b that are positioned closer to the outlet nipple 7 than to the midpoint between the inlet nipple 6 and the outlet nipple 7. Thus, the temperature of the high temperature coil portions 3a and 3b can be detected reliably.

The outer wall 51s of the first flow channel 51a and the second flow channel 51b is spaced from the inner wall 1s of the housing 1. Therefore, the temperature at the first flow channel 51a and the second flow channel 51b does not rise when the temperature of the housing 1 does so. Likewise, the temperature of the coil portions 3 positioned along the first flow channel 51a or the second flow channel 51b does not rise, either. As a result, it becomes possible to stably detect the temperature of the coil portions 3 positioned along the first flow channel 51a or the second flow channel 51b.

The temperature detection element 91 is provided between the two adjacent coil portions 3a and 3b. Thus, the temperature of the high-temperature coil portions 3a and 3b can be detected reliably.

The inlet nipple 6 and the outlet nipple 7 are disposed spaced apart from each other. Accordingly, there is no need to lay overlapping piping, i.e. the first flow channel 51a and the second flow channel 51b, in a convoluted manner. This makes for good piping layout properties in a vehicle.

The inlet nipple 6 and the outlet nipple 7 are disposed spaced apart from each other, and accordingly the lengths of the first flow channel 51a and the second flow channel 51b are unequal. This gives rise to a clear temperature distribution, and makes it easier to specify the high-temperature coil portions 3a and 3b.

Embodiment 2

A rotary electric machine of Embodiment 2 will be explained next with reference to FIG. 3. In Embodiment 2, the rotor rotates at high speed, and accordingly a temperature detection element is provided in coil portions different from those of Embodiment 1.

Figure 3:
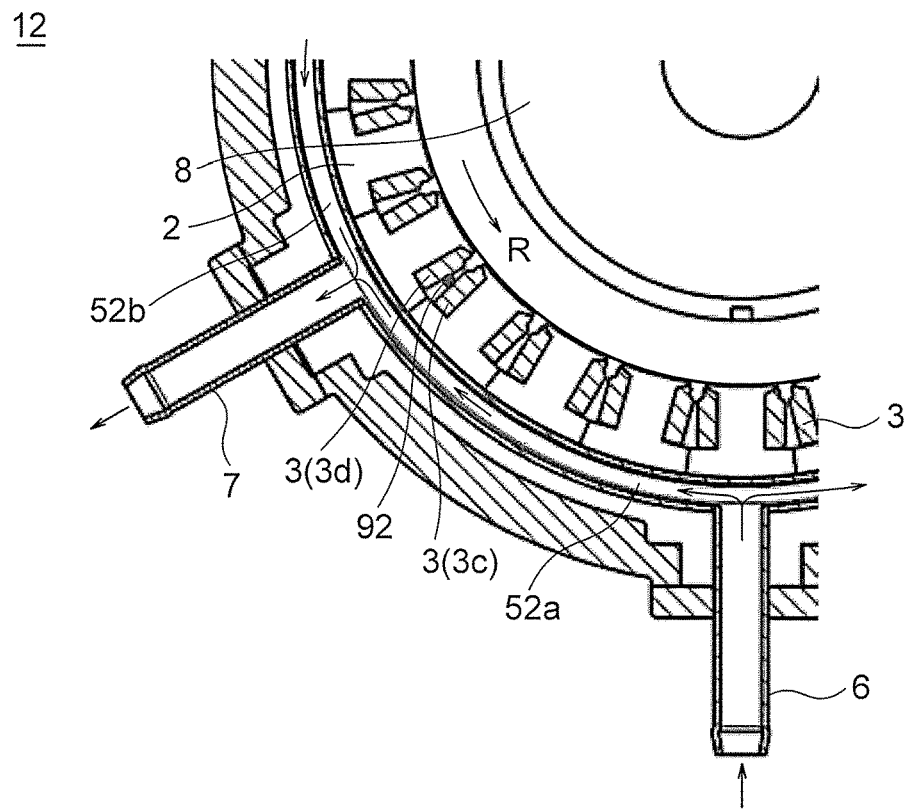
FIG. 3 is a partial cross-sectional view, in the axial direction, of a rotary electric machine of Embodiment 2.

FIG. 3 is a partial cross-sectional view, in the axial direction, of a rotary electric machine 12 of Embodiment 2. A first flow channel 52a and a second flow channel 52b having different lengths are provided along the coil portions 3 of the stator 2. The inlet nipple 6 and the outlet nipple 7 are provided in the first flow channel 52a and the second flow channel 52b. In the first flow channel 52a, the cooling water advances from the inlet nipple 6 in a clockwise direction, to reach the outlet nipple 7. In the second flow channel 52b, the cooling water advances from the inlet nipple 6, in a counterclockwise direction, to reach the outlet nipple 7.

The rotor 8 rotates in a counterclockwise direction R, as denoted by the arrow in the figure. In Embodiment 2, the rotational speed of the rotor 8 is higher than in Embodiment 1. In the first flow channel 52a, a temperature detection element 92 is provided between coil portions 3c and 3d positioned upstream of the outlet nipple 7.

The rotor 8 rotates in the counterclockwise direction R, and hence generates wind in the counterclockwise direction. The wind generated through high-speed rotation of the rotor 8 causes heat to move along. On account of the influence of the wind generated by the rotor 8, the heat generated by the coil portions 3 in the second flow channel 52b moves towards the coil portions 3c and 3d in the first flow channel 52a positioned downstream of the wind, i.e. frontward in the rotation direction of the rotor 8, near the outlet nipple 7. As a result, the temperature of the coil portions 3c and 3d in the first flow channel 52a near the outlet nipple 7 is higher than the temperature of the coil portions 3 in the second flow channel 52b near the outlet nipple 7. The temperature of the high-temperature coil portions 3c and 3d can thus be detected by providing the temperature detection element 92 between the coil portions 3c and 3d in the first flow channel 52a near the outlet nipple 7.

Thus, in the rotary electric machine 12 of Embodiment 2, the first flow channel 52a extends from the inlet nipple 6 towards the outlet nipple 7, in a clockwise direction that is the direction opposite to the rotation direction R of the rotor 8, and the temperature detection element 92 is provided in the coil portions 3c and 3d positioned at the inlet nipple 6 side relative to the outlet nipple 7, in the first flow channel 52a.

In the vicinity of the outlet nipple 7, the temperature of the coil portions 3 is higher frontward in the rotation direction of the rotor 8 due to the influence of the wind generated by the rotor 8. That is, the temperature of the coil portions 3 in the first flow channel 52a near the outlet nipple 7 is higher than the temperature of the coil portions 3 in the second flow channel 52b near the outlet nipple 7. As a result, the temperature detection element 92 can detect the temperature of the high-temperature coil portions 3c and 3d.

Embodiment 3

A rotary electric machine of Embodiment 3 will be explained next with reference to FIG. 4. In Embodiment 3, a stopper for blocking flow is provided in the middle of one of the flow channels.

Figure 4:
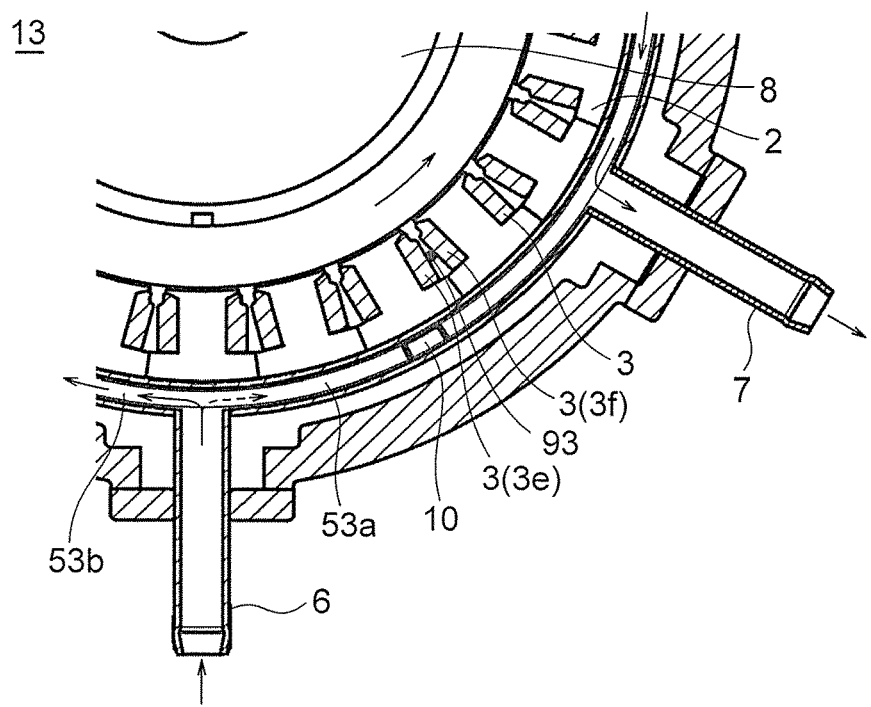
FIG. 4 is a partial cross-sectional view, in the axial direction, of a rotary electric machine of Embodiment 3.

FIG. 4 is a partial cross-sectional view, in the axial direction, of a rotary electric machine 13 of Embodiment 3.

A first flow channel 53a and a second flow channel 53b having different lengths are provided along the coil portions 3 of the stator 2. The inlet nipple 6 and the outlet nipple 7 are provided in the first flow channel 53a and the second flow channel 53b. A stopper 10 for stopping flow in the first flow channel 53a is provided in the middle of the first flow channel 53a. The stopper 10, which is provided for striking a balance of flow rate, adjusts the overall flow by limiting the flow of water to the second flow channel 53b alone, which is the longer flow channel.

In the second flow channel 53b, the cooling water advances from the inlet nipple 6 in a clockwise direction, to reach the outlet nipple 7. In the first flow channel 53a, the cooling water advances from the inlet nipple 6, in a counterclockwise direction, to reach the outlet nipple 7. However, the cooling water that would flow through the first flow channel 53a is blocked by the stopper 10. A temperature detection element 93 is provided between coil portions 3e and 3f positioned closest to the stopper 10.

The flow of cooling water in the first flow channel 53a is blocked by having the stopper 10 provided therein. Accordingly, the coil portions 3 in the vicinity of the stopper 10 are at high temperature. The temperature of the high-temperature coil portions 3e and 3f can be detected by providing the temperature detection element 93 between the coil portions 3e and 3f positioned closest to the stopper 10.

Thus, in the rotary electric machine 13 of Embodiment 3, the stopper 10 that blocks the first flow channel 53a is provided in the middle of the first flow channel 53a, and the temperature detection element 93 is provided in the coil portions 3e and 3f positioned closest to the stopper 10.

By virtue of the stopper 10 being provided in the first flow channel 53a, the cooling water does not flow in the first flow channel 53a, and accordingly the coil portions 3 positioned along the first flow channel 53a are not cooled. Therefore, the temperature detection element 93 is provided in the coil portions 3e and 3f positioned closest to the stopper 10, as a result of which it becomes possible to detect the temperature of the high-temperature coil portions 3e and 3f. Further, the flow in the second flow channel 53b can be stabilized by providing the stopper 10 in the first flow channel 53a.

The rotary electric machine of the present invention, thus can detect stably the temperature of high-temperature coil portions, among temperatures of stator coil portions that often exhibit significant variability. It therefore becomes possible to realize heat protection using torque suppression based on values detected by the temperature detection element.

What is claimed is:

1. A rotary electric machine having inside a housing a rotor and a stator that are concentric with each other, wherein
    the stator has a plurality of coil portions in a circumferential direction,
    in the stator, a first flow channel and a second flow channel, through which cooling water flows, are provided along the plurality of coil portions, each of the channels having one end connected to a flow channel inlet and the other end connected to a flow channel outlet,
    the lengths of the first flow channel and the second flow channel are mutually different, and
    a temperature detection element is provided in a coil portion on a high temperature side among the coil portions positioned along the first flow channel and the coil portions positioned along the second flow channel.

2. The rotary electric machine of claim 1, wherein
    a flow rate in the first flow channel is lower than a flow rate in the second flow channel; and
    the temperature detection element is provided, in the first flow channel, in the coil portion positioned closer to the flow channel outlet than to the midpoint between the flow channel inlet and the flow channel outlet.

3. The rotary electric machine of claim 1, wherein
    the first flow channel extends from the flow channel inlet towards the flow channel outlet, in a direction opposite to a rotation direction of the rotor; and
    the temperature detection element is provided in the coil portion positioned at the flow channel inlet side relative to the flow channel outlet, in the first flow channel.

4. The rotary electric machine of claim 1, wherein
    a stopper that blocks the first flow channel is provided in the middle of the first flow channel; and
    the temperature detection element is provided in the coil portion positioned closest to the stopper.

5. The rotary electric machine of claim 1, wherein an outer wall of the first flow channel and the second flow channel is spaced from an inner wall of the housing.

6. The rotary electric machine of claim 2, wherein an outer wall of the first flow channel and the second flow channel is spaced from an inner wall of the housing.

7. The rotary electric machine of claim 3, wherein an outer wall of the first flow channel and the second flow channel is spaced from an inner wall of the housing.

8. The rotary electric machine of claim 4, wherein an outer wall of the first flow channel and the second flow channel is spaced from an inner wall of the housing.

9. The rotary electric machine of claim 1, wherein the temperature detection element is provided between two adjacent coil portions.

10. The rotary electric machine of claim 2, wherein the temperature detection element is provided between two adjacent coil portions.

11. The rotary electric machine of claim 3, wherein the temperature detection element is provided between two adjacent coil portions.

12. The rotary electric machine of claim 4, wherein the temperature detection element is provided between two adjacent coil portions.

13. The rotary electric machine of claim 5, wherein the temperature detection element is provided between two adjacent coil portions.

14. The rotary electric machine of claim 6, wherein the temperature detection element is provided between two adjacent coil portions.

15. The rotary electric machine of claim 7, wherein the temperature detection element is provided between two adjacent coil portions.

16. The rotary electric machine of claim 8, wherein the temperature detection element is provided between two adjacent coil portions.

\* \* \* \* \*